Jan. 12, 1960 W. J. LITWIN ET AL 2,921,280
VARIABLE COUPLING TRANSFORMER DEVICE
Filed May 13, 1957 3 Sheets-Sheet 1
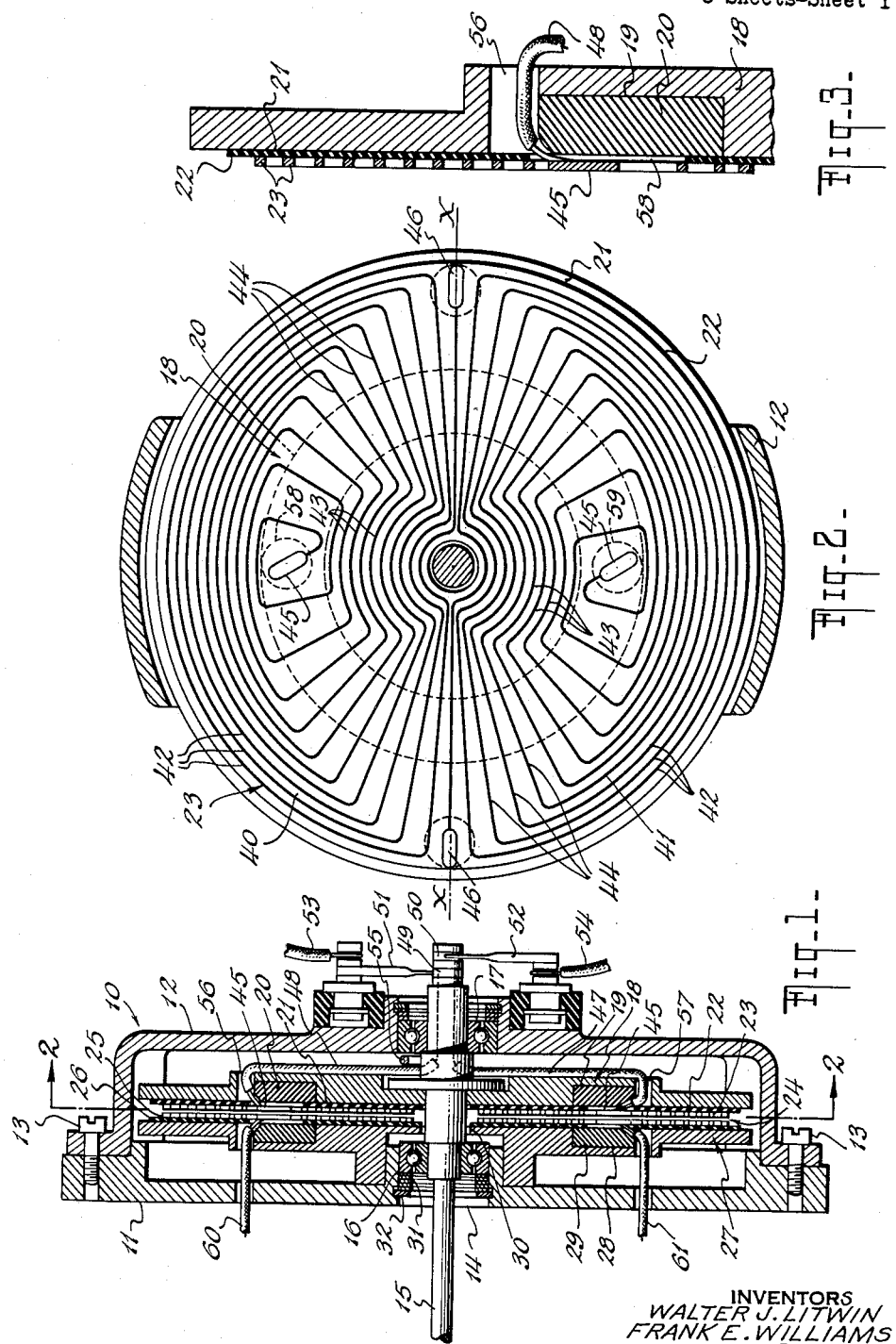
INVENTORS
WALTER J. LITWIN
FRANK E. WILLIAMS
BY
ATTORNEY

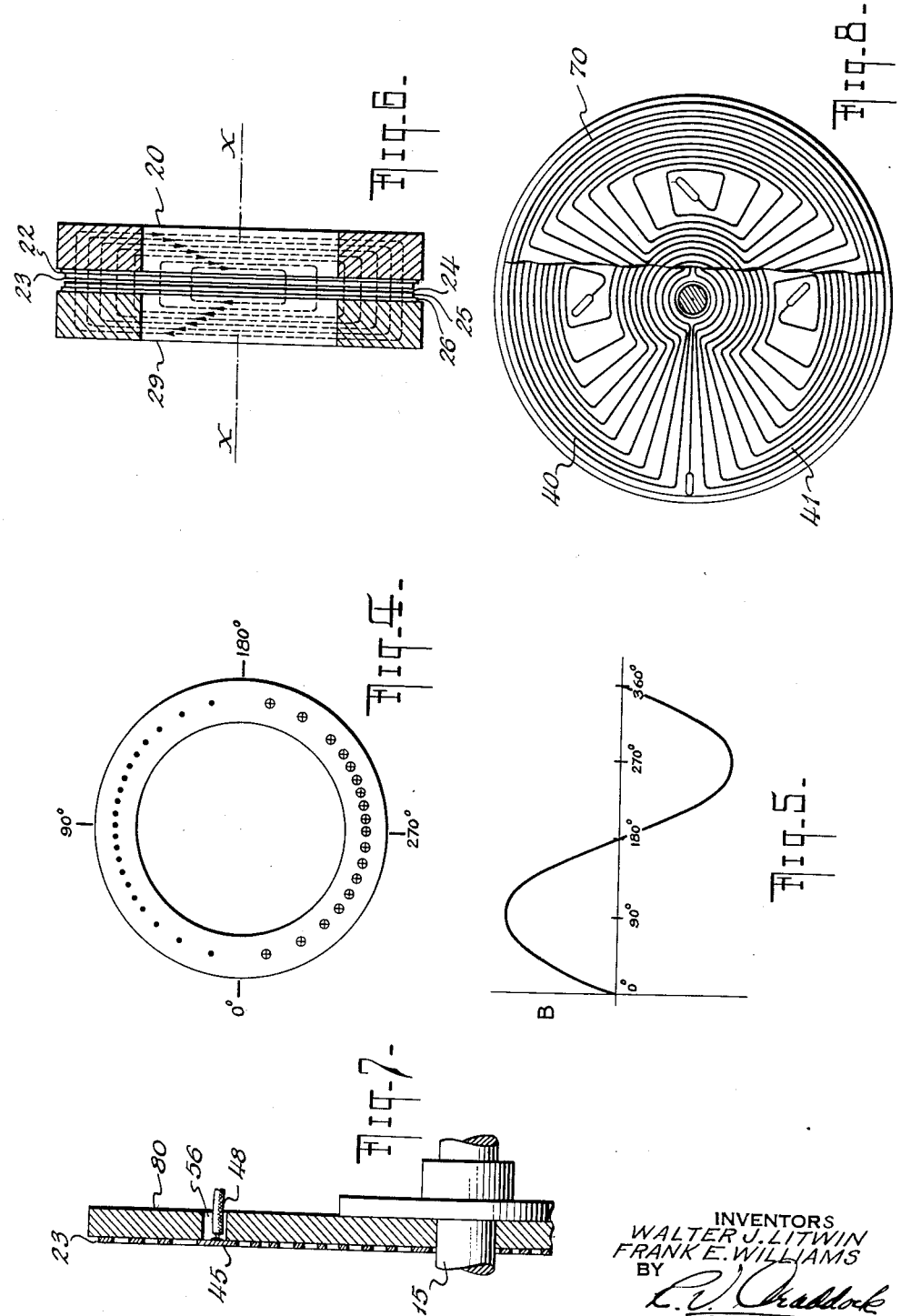

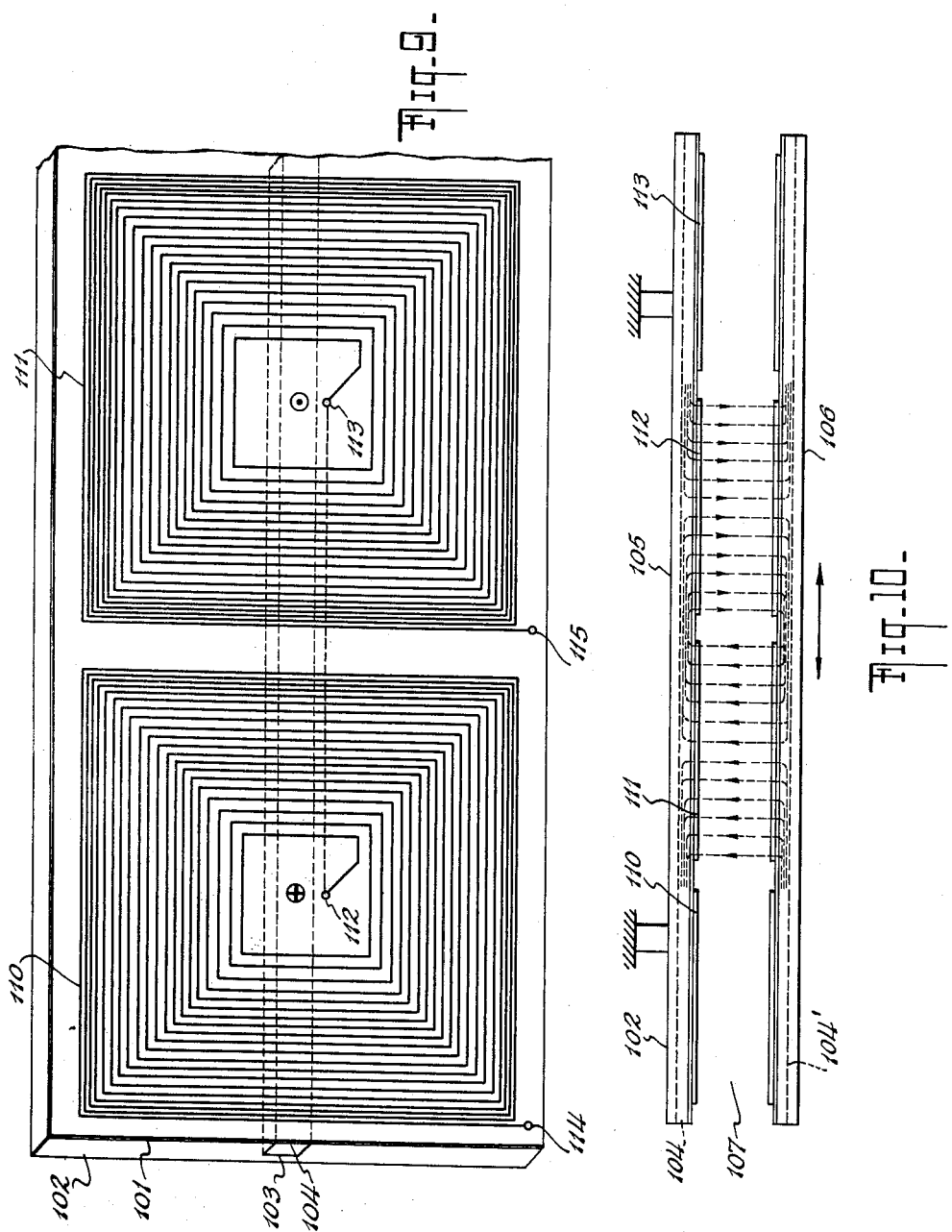

United States Patent Office 2,921,280
Patented Jan. 12, 1960

2,921,280

VARIABLE COUPLING TRANSFORMER DEVICE

Walter J. Litwin, Ridgewood, and Frank E. Williams, Plainview, N.Y., assignors to Sperry Rand Corporation, a corporation of Delaware Application May 13, 1957, Serial No. 658,556

8 Claims. (Cl. 336—120)

This invention relates to variable coupling transformer devices and more particularly to improvements in such devices employing printed windings.

In many diverse applications it is necessary that the relative position of two members which are movable with respect to each other be measured and transmitted in the form of electrical signals to a utilization device. To accomplish this task in the case where the movable member is a rotatable shaft, a device commonly termed a synchro is usually employed. A synchro is a voltage transformer device in which the relative angular alignment between the primary and secondary windings is variable, and the magnitude of the secondary output voltage is a function of the angular position of the primary winding with respect to the secondary winding. In the past such devices have been built in a form resembling a small electrical motor, in that one of the windings is comprised of conductors wound in slots in the inner surface of a hollow cylindrical shaped stator member and the other winding is wound on a rotor member which is free to rotate coaxially within the stator member. Although devices of this type have in general been quite useful they have certain deleterious features which limit their utility. Some of these features are as follows: the discontinuities in the rotor and stator members introduced by the winding slots causes the coupling between the windings to fluctuate as the rotor member turns, thus introducing fluctuations in the output voltage; winding the conductors in the slots is a laborious and time-consuming task; because of the finite number of slots in the rotor and stator members the desired accuracy in the winding distribution cannot always be achieved; hysteresis and eddy current losses become excessive at high frequencies; and the dissipation of heat generated in the winding slots sometimes presents a problem.

In an attempt to eliminate these problems synchro devices have been built which employ printed circuit techniques to print the primary and secondary windings on relatively thick disks of non-magnetic insulating material. These discs are placed parallel to each other and a rotatable shaft is joined to one disk so that the longitudinal axis of the shaft is perpendicular to the disk.

In such a device there is inductive coupling between the primary and secondary windings through a narrow air gap separating the two windings. Each winding has a certain winding pattern and as one winding is rotated with respect to the other winding, the coupling between windings will vary, thus causing the output voltage of the secondary winding to vary as a function of the rotatable shaft position. However, in known devices of the type described, because of the type of flux pattern established by the windings, and because of the low permeability of the magnetic circuit and the resultant flux leakage, the efficiency of such devices is extremely low, despite the fact that the primary and secondary windings are positioned with a minimum of spacing between them. In certain of these devices the output voltage is in the order of millivolts which requires that additional amplifying equipment be included in order that the output voltage may be raised to a usable level.

Therefore, it is an object of this invention to provide a highly efficient variable coupling transformer device.

It is another object of this invention to provide a variable coupling transformer device having highly accurate winding patterns.

It is another object of this invention to provide a variable coupling transformer device which is simple and economical to construct.

It is another object of this invention to provide a variable coupling transformer device capable of operating at high frequencies.

These and other objects which will become apparent as the description proceeds are achieved by providing a variable coupling transformer device comprising a printed primary winding arranged in a plane surface to produce a predetermined flux pattern, and a printed secondary winding having a given winding distribution arranged in a plane surface disposed parallel to the primary winding and separated from the primary winding by an air gap. The primary and secondary windings are magnetically coupled.

Two cores of magnetic material provide a low reluctance path over a portion of the magnetic circuit established in the device. One of the cores is located on the side of the primary winding opposite the air gap, and the other core is located on the side of the secondary winding opposite the air gap. Means are provided for joining one of the windings to a movable member so that one winding may move relative to the other winding.

In the variable coupling transformer device built in accordance with this invention the relative motion between the primary and secondary windings may be either rotary or linear, as will be explained hereinafter.

For a better understanding of the invention reference is made to the accompanying drawings wherein:

Fig. 1 is a cross-sectional view of one embodiment of the variable coupling transformer device of this invention;

Fig. 2 is a sectional view taken along line 2—2 showing the winding arrangement employed in one embodiment of the invention;

Fig. 3 is an enlarged partial sectional view of a portion of Fig. 1 showing in greater detail the printed winding, the dielectric material, and the magnetic core;

Figs. 4, 5, and 6 are diagrammatic representations used to describe the magnetic circuit established in the device of this invention.

Fig. 7 is an enlarged partial sectional view showing the printed winding and magnetic core constructed in accordance with another embodiment of this invention;

Fig. 8 is a diagrammatic representation of secondary windings of a resolver constructed in accordance with this invention;

Fig. 9 is a schematic representation of the winding pattern employed in an alternative embodiment of this invention; and Fig. 10 is a representation of a device having linear motion and constructed in accordance with the present invention.

Referring now more particularly to Fig. 1 there is shown the assembled synchro 10 enclosed in a housing comprised of two members 11 and 12 which may be secured together around their periphery by suitable means such as screws 13. Extending through a central aperture 14 in housing member 11 is a rotatable shaft 15 which is free to rotate with respect to members 11 and 12 by means of bearings 16 and 17. Secured to the shaft 15 and coaxial about shaft 15 is a circular face plate 18 which extends perpendicular to the longitudinal axis of shaft 15. Face plate 18 is made of a non-magnetic material such as aluminum.

An annular groove 19 in face plate 18 receives an annular core 20 of magnetic material. We have found that a ferromagnetic material called "Ferroxcube FXC-3," manufactured by Ferroxcube Corporation of America, provides a very suitable material for this core, as will be more fully discussed, hereinafter.

Secured to the flat surface 21 formed by face plate 18 and annular core 20 is a thin sheet of dielectric material 22 which has printed on its opposite plane surface a conductive electrical winding 23. Winding 23 may be printed on the dielectric material 22 by any of the processes well known in the printed circuit art. In making the windings for the synchro device of this invention the photo-etch process has been quite successful. To assure optimum performance of the synchro constructed in this manner the dielectric material 22 should have a thickness less than the thickness of the printed winding 23, as will be more fully explained in connection with Fig. 6.

Disposed parallel to the plane of winding 23 and separated from winding 23 by an air gap 24 is a second printed winding 25 which is printed on a plane surface of dielectric material 26.

A second face plate 27 is provided with an annular groove 28 which supports a second annular core of magnetic material 29. Dielectric material 26 is secured to the flat surface formed by annular core 29 and face plate 27. Face plate 27 is rigidly secured to housing member 11 and is provided with a center aperture 30 to permit free passage of rotatable shaft 15. Similarly, dielectric materials 22 and 26, and printed windings 23 and 25 are provided with center apertures to permit passage of shaft 15.

To restrain shaft 15 and consequently winding 23 against lateral movement, a shim 31 is placed between the outer race of bearing 16 and restraining ring 32. A similar arrangement is provided for bearing 17.

Fig. 2 represents a preferred embodiment of the printed windings used in the synchro device of this invention. The winding 23 is comprised of two oppositely spiraled coils 40 and 41 which in this embodiment are printed on a plane circular surface of dielectric material 22, which is in turn secured to the flat lateral surface formed by face plate 18 and annular core 20.

The lateral surface formed by annular ring 20 and face plate 18 is machined, or ground, to assure that a flat plane surface is obtained.

Each coil occupies one-half of the plane circular surface and is comprised of a plurality of concentric arcuate conductors 42 and 43. The ends of these arcuate conductors are joined by radially extending conductors 44 so as to form a spiral. The terminals of the printed coils are shown at 45 and 46. Electrically the coils are connected in series so that the terminals 46 are joined together and the terminals 45 are connected to conductors leading to external connectors.

In Fig. 1 the two terminals 45 are connected by leads 47 and 48 to slip rings 50 and 49, respectively. Brushes 51 and 52 provide electrical connection between slip rings 49 and 50 and external leads 53 and 54. Terminals 46 are connected by lead 55. If preferred, terminals 45 may be joined together and terminals 46 may be connected to the slip rings. In practice a cover (not shown) will be provided for the brush and slip ring assembly.

Suitable holes 56 and 57 are provided in face plate 18 to permit passage of leads 47 and 48 to terminals 45 of winding 23. Also, dielectric material 22 is provided with two holes 58 and 59 to permit access to terminals 45. Similar provisions are made in dielectric material 26 and face plate 27 so that conductors 60 and 61 may be connected to the terminals of primary winding 25. In practice, leads 60 and 61 will be connected to an electrical supply source.

An enlarged view of the electrical connection to one terminal 45 is shown in Fig. 3.

The two coils 40 and 41 are arranged, or distributed, to produce a one-cycle sinusoidal flux pattern around the face of winding 23 when a current is passed through the coils; each coil establishing one-half the sinusoidal flux pattern. In determining the winding distribution for a coil used in a synchro built in accordance with this invention, the maximum number of convolutions that could be physically placed in the coil was first determined. For example, in designing a winding that was to have a 2 5/16-inch diameter it was determined that the maximum number of convolutions for each coil was 20. Ten convolutions are shown in Fig. 2 for purposes of simplicity. Next, deciding that each convolution of the coil was to contribute an equal amount to the sinusoidal flux pattern, and considering that the maximum value of a sine function is 1.00, it is evident that each convolution will contribute .05 (0.5×20=1.00) to the resultant sine function which varies from 0 to 1.00.

Since it is desirable in the above mentioned winding to displace the first of the radially extending conductors 44 from the horizontal axis X—X in order to make room for terminals 46, the angular displacement of the radial conductors from the horizontal axis X—X is in accordance with the relation $\theta_N = \sin^{-1}(.05N - .025)$, where N is the number of the convolution progressing from 1 to 20 from the outside of the spiral to the center of the spiral, and the term .025 accounts for the displacement of the first radial conductor from the horizontal axis.

The flux pattern actually produced is a step function closely resembling a sine wave. The more convolutions employed in a spiral, the closer the pattern will approximate a true sine function. A close approximation to a sine function is desirable in order to avoid higher order harmonics in the flux.

As mentioned above, each coil contributes one-half a cycle to the sine wave flux pattern. Since the two coils are series connected and oppositely spiraled, it may be considered that the two coils establish two magnetic poles of opposite polarity wherein the strength of each pole varies in a half-sinusoidal manner.

It is not intended that this invention be limited to the particular winding arrangement described, and if so desired, windings which produce any other predetermined flux pattern may be used.

By employing printed circuit techniques in making the printed windings, highly accurate winding distributions are possible. The designer is not limited to a finite number of slots in which he must place his conductors as is the case with wound rotor and stator devices. In addition, if the photo-etch printing process is employed, the master drawing from which the photographic negative is made may be many times the size of the printed winding, thus allowing greater accuracy in the negative itself. Once the negative is obtained it is a simple process to expose and etch the metal surface to form the winding, thereby saving much time and labor.

In placing the printed windings on the synchro device it is merely required that the winding be secured by an adhesive material to the plane surface formed by the magnetic core and face plate, and that the necessary electrical connections be made.

The cores of magnetic material 20 and 29 will provide low reluctance paths for the flux and will serve to concentrate the flux in the magnetic cores. A diagrammatic representation of the sinusoidal flux pattern on the face of the core is shown in Fig. 4. A curve representing the magnitude of the flux pattern around the annular core at a particular instant of time is shown in Fig. 5.

Fig. 6 is a representative drawing showing the complete magnetic circuit at one instant of time. For simplicity, only the annular cores 20 and 29, the windings 23 and 25, and the dielectric materials 22 and 26 are shown. Assuming that winding 23 is the primary winding, and that coil 40 lies above the horizontal axis X—X and coil 41 lies below the axis, it is seen that the flux produced by winding 23 will travel in a closed path between the annular cores 20 and 29 and across the air gap 24, thus providing magnetic coupling between primary winding 23 and secondary winding 25.

Fig. 6 illustrates the features which allow a device constructed in accordance with this invention to achieve tight coupling between the primary and secondary windings. That is, all of the convolutions of one coil contribute to one flux pattern having a half sinusoidal variation. In addition, the magnetic cores provide a low reluctance path over a portion of the magnetic circuit thus minimizing flux leakage. Also, the air gap is made as narrow as possible, thus minimizing that portion of the magnetic circuit which has a high reluctance. For example, in a synchro built in this manner employing annular cores made from "Ferroxcube FXC-3," the input voltage to the primary winding was 2 volts, and with the secondary coil in the position for maximum coupling, the output voltage of the secondary was 1.98 volts.

This is a highly desirable feature in that for many applications additional amplifying equipment is not required to bring the output signal up to a usable level.

To achieve this tight coupling it is necessary that the width of the air gap 24 be kept as narrow as possible. In Fig. 6 it is seen that the width of the air gap is determined by the spacing between the flat surfaces of annular cores 20 and 29. In order to keep the width of the air gap as small as possible the windings 23 and 25 were printed on thin sheets of dielectric material having a thickness less than the thickness of a printed winding. In Fig. 6 the thickness of the dielectric material and the thickness of the printed winding has been increased for illustrative purposes.

In a printed winding for the device of this invention, the thickness of the printed winding was 1.5 mils, and the thickness of the dielectric material was .5 mil.

These features are unattainable in the known prior art devices which employ windings printed on relatively thick dielectric materials. One reason is that no means are provided for concentrating the flux pattern produced by the primary winding, consequently the coupling between the primary and secondary windings is relatively weak. Nor would the addition of magnetic cores to such prior art devices result in a device having the tight coupling achieved in the device of this invention. Because prior art devices employ relatively thick dielectric materials, the air gap separating the magnetic cores would be correspondingly increased, and the coupling achieved in the device of this invention would be unattainable. Additionally, in many prior art devices the coupling between primary and secondary windings is established by the separate flux patterns produced by individual radial conductors or by individual arcuate conductors rather than by one resultant flux pattern established by all of the convolutions of the spiraled coils of the present invention. Thus it is seen that the strong, concentrated flux pattern and narrow air gap of this invention are unattainable in prior art devices.

In order to assure that air gap 24 is kept to a practical minimum, the dielectric material may be eliminated and the windings may be printed directly on the flat surface of the magnetic core, as is represented in Fig. 7. In this embodiment the magnetic core is in the form of a circular disk 80 rather than annular shaped as in the above-described embodiment. The winding 23 is printed directly on the flat surface of the disk by any suitable printed circuit process.

Magnetic disk 80 is provided with aperture 56 to permit electrical lead 48 to connect to terminal 45 of the winding.

In operation of the device shown in Fig. 1, fixed winding 25 is the primary winding of the synchro and is connected to an A.C. electrical source by conductors 60 and 61. The secondary winding 23 is joined to rotatable shaft 15 and is electrically connected to external leads 53 and 54 through conductors 47 and 48, slip rings 49 and 50, and brushes 51 and 52. It is to be understood that the function of the two windings could be reversed if so desired. That is, winding 23 could be the primary winding and winding 25 could be the secondary winding. Both windings have a pattern, or distribution, as shown in Fig. 2, although either or both may have a different winding pattern if a different output function of the shaft rotation is desired. Assuming that shaft 15 is in a position such that the two windings are in direct alignment with each other, like terminals of the two windings being opposite each other, the magnetic coupling between the two windings will be a maximum, and a maximum voltage will be induced in secondary winding 23. As shaft 15 is rotated the two windings will be angularly displaced with respect to each other and the coupling between the two windings will be decreased. Since the flux pattern established by primary winding 25 is a sinusoidal pattern, as shown in Figs. 4 and 5, the voltage induced in secondary winding 23 will vary in a sinusoidal manner as shaft 15 is rotated. In one complete revolution of shaft 15, the voltage induced in secondary winding 23 will have a one-cycle sinusoidal variation. In this manner the magnitude of the output voltage of the secondary winding 23 is a sinusoidal function of the angular displacement of shaft 15.

Another embodiment of the present invention could have each of the windings 23 and 25 joined to separate rotatable shafts, in which case the output signal of the secondary winding would be a function of the displacement of the two shafts relative to each other.

The synchro shown in Fig. 1, having a double bearing support for the rotatable shaft, is but one possible embodiment of the present invention. If desired, winding 25 may be connected to rotatable shaft 15 and winding 23 may be the stationary winding. In such an embodiment shaft 15 will not have to pass through the windings and the arcuate conductors 43, Fig. 2, may then be straight conductors joining the ends of the radial conductors 44.

However, the embodiment shown in Fig. 1 is the preferred emboidment because it is necessary that the planes of the two windings be maintained as nearly parallel as possible as shaft 15 rotates, and the double bearing support shown in Fig. 1 will provide better support for the shaft and its associated winding than would the single bearing embodiment suggested above.

In addition to having a single winding on the secondary, synchro devices having two or more secondary windings may readily be constructed in accordance with the present invention. For instance, a resolver having two secondary windings angularly displaced from each other may be constructed by printing another winding on a thin sheet of dielectric material and securing this winding directly on the face of the first printed secondary winding. Such an arrangement for the secondary of a resolver is shown in diagrammatic form in Fig. 8. As shown in this figure, coils 40 and 41 comprise the coils of one secondary winding, and coil 70 would comprise one coil of a second secondary winding. Any suitable adhesive material may be used to secure the dielectric material of the second winding to the first winding. The electrical leads of the two secondaries may be brought out to slip rings in the conventional manner.

It may also be desirable to construct a rotary synchro device having more than one primary winding. Such a primary would also take the form illustrated in Fig. 8 in which case the two windings would be connected to an external electrical supply source.

Synchros with three or more secondary windings having fixed angular relationships with respect to each other may be constructed in a similar manner.

Because the printed winding and the dielectric material on which it is printed are very thin, the width of the air gap is not greatly increased when two or more windings are placed on the secondary, and the performance of the device is not appreciably affected.

As indicated above, the magnetic cores 20 and 29 may be made of a ferromagnetic material. Although this invention is not limited to the use of such material in the magnetic cores, ferrites have known properties which allow the device of this invention to operate in frequency ranges that are higher than the frequencies at which conventional synchros employing wound rotors and stators can operate. One device built in accordance with this invention and employing a ferrite core operated satisfactorily over the frequency range of 80 kc. to 200 kc.

Although this invention has been described thus far in connection with a variable coupling transformer device of the rotary type, the invention may also be practiced in a variable coupling transformer device wherein the relative motion between the primary and secondary windings is linear.

A partial representation of one winding of such a device is illustrated in Fig. 9, wherein the printed coils 110, 111 may take the form of rectangular shaped spirals which are printed on a thin sheet of dielectric material 101, which is in turn secured to the flat surface of plate member 102. Plate member 102 may be any suitable non-magnetic material. A groove 103 extends along the length of the flat surface of member 102 and receives a rod of magnetic materail 104. The rod of magnetic material 104 will serve the same purpose as the annular ring of magnetic material employed in the rotary embodiment of this invention.

Printed coils 110 and 111 are arranged, or distributed, in a suitable manner so that the two coils will produce a one-cycle sinusoidal flux pattern. This may be accomplished by connecting terminals 112 and 113 in series as shown, and connecting terminals 114 and 115 to an external source, or to adjacent coils if more than two coils are to be used, as will most often be the case. In practice printed coils 110 and 111 will be located immediately adjacent each other in order to assure a smooth sinusoidal flux pattern.

When a winding is comprised of a plurality of printed coils, they will be electrically connected so that the flux pattern produced will be a continuous sine wave having a number of cycles equal to the number of pairs of coils employed on the primary winding. As indicated in Fig. 9, adjacent coils establish magnetic poles of opposite polarity.

The operation of the linear embodiment of the variable coupling transformer constructed in accordance with this invention will be described by referring to Fig. 10. The device will be comprised of two members, member 105 having a primary winding similar to the winding described in Fig. 9, and a member 106 which is constructed in a similar manner to member 105.

Member 105, having the primary winding, may be secured to a stationary device, and member 106, having the secondary winding, may be secured to a device or a member of a device which moves with a linear motion with respect to the stationary device. Assuming that the primary winding comprised of coils 110, 111, 112 and 113 is energized from an external source of A.C. voltage, the primary winding will establish a sinusoidal flux pattern across air gap 107, thus magnetically coupling the primary and secondary windings. In practice air gap 107 will be as narrow as possible and is exaggerated here for illustrative purposes.

The rods of magnetic materials 104 and 104' will provide a low reluctance path for the flux in the magnetic circuit established in the device. The magnetic circuit established in this device will be comprised of a plurality of paths. Only the magnetic circuit of two pairs of opposite coils is illustrated.

As member 106 moves with respect to member 105, the coupling between the primary and secondary windings will vary in such a manner that the output voltage of the secondary winding will have a maximum value when the coils of the primary and secondary windings are directly opposite each other, and will be a minimum value when the coils of the secondary windings are midway between the coils of the primary winding. As the secondary winding continues to move in the same direction with respect to the primary winding, the voltage induced in the secondary winding will change 180° in phase and will increase to a maximum value when the coils of the secondary winding are again directly opposite the coils of the primary winding. When the secondary winding has moved a distance equal to the length of a pair of coils on the primary winding, the variation in the output voltage on the secondary winding will have gone through one complete cycle of a sine wave.

If more than one secondary output voltage is desired, additional secondary windings may be secured to member 106 in a manner similar to the method described for a rotary device having a plurality of secondary windings.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A variable coupling transformer device comprising a printed primary winding comprised of a plurality of coils printed on a plane surface, each of said coils being spiraled about a respective axis which is normal to said plane surface, a printed secondary winding like said primary winding disposed on a plane surface which is parallel to said primary winding and separated from said primary winding by an air gap, means for providing movement of one of said windings relative to the other of said windings, each of the coils of the respective windings having a plurality of straight conductors each of which extends in a direction substantially normal to the direction of relative motion between said windings, the straight conductors in the coils of said primary winding being distributed to provide a predetermined flux pattern in a magnetic circuit which inductively couples said windings when said primary winding is energized by an electrical source, first and second members of magnetic material each disposed parallel to and adjacent a respective winding on the side thereof opposite said air gap and each providing at least partial means for supporting the respective winding, each of said magnetic members having the characteristic that the portion adjacent and parallel to a respective winding is a single plane surface which extends between the axes of the spirals of a respective winding and which lies in the path traversed by the axes of the spirals of the movable winding as it moves relative to the other winding, said magnetic members thereby forming low reluctance portions of the magnetic circuit coupling said windings, wherein the reluctance of the magnetic circuit coupling said windings, by virtue of the arrangement and positioning of the magnetic members, is substantially constant regardless of the relative position of said windings.

2. The combination as claimed in claim 1 wherein said primary and secondary windings are each comprised of two spiraled coils printed on a plane circular surface and each coil occupies substantially one-half of a respective circular surface, said circular surfaces having a common center axis, the movement of one of said windings relative to the other winding being about said common axis.

3. The combination as claimed in claim 1 wherein said primary and secondary windings are each printed on respective plane sheets of dielectric material which have thicknesses less than the thickness of a printed winding, each sheet of dielectric material being secured to said plane surface of a respective magnetic member.

4. The combination as claimed in claim 1 wherein said plane surface of each of said magnetic members has an area at least as large as the plane area occupied by one of said windings and each of said windings is printed on the plane surface of a respective one of said magnetic members.

5. The combination as claimed in claim 1 wherein the axes of the spirals of the coils of each of said windings are disposed perpendicularly to a longitudinal axis, and the movement of said movable winding is in a direction parallel to said longitudinal axis.

6. The combination as claimed in claim 1 including a second secondary winding like the first-named secondary winding disposed parallel to and immediately adjacent the first secondary winding, the axes of the spirals of the coils of said second secondary windings lying in the path traversed by the axes of the spirals of the movable winding.

7. The combination as claimed in claim 2 wherein said straight conductors extend radially from said common axis.

8. The combination as claimed in claim 7 wherein the radially extending conductors of said primary winding are successively angularly disposed from a diameter of said circular surface according to a sinusoidal function whereby said primary winding produces a flux pattern which varies in intensity around said circular surface in a sinusoidal manner.

References Cited in the file of this patent

UNITED STATES PATENTS

| | | |
|---|---|---|
| 893,340 | Mansbridge | July 14, 1908 |
| 1,664,513 | Jones | Apr. 3, 1928 |
| 2,650,352 | Childs | Aug. 25, 1953 |
| 2,799,835 | Tripp | July 16, 1957 |

FOREIGN PATENTS

| | | |
|---|---|---|
| 224,976 | Great Britain | Nov. 27, 1924 |